US006539846B2

(12) United States Patent  (10) Patent No.: US 6,539,846 B2
Citterio et al.  (45) Date of Patent: Apr. 1, 2003

(54) APPARATUS FOR DELIVERING MEALS AT AN APPROPRIATE TEMPERATURE, PARTICULARLY FOR USE IN HOSPITALS

(75) Inventors: Valter Citterio, Moncalieri (IT); Arturo Lesca, Palazzo Canavese (IT)

(73) Assignee: Tecnhos S.r.l., Pont Saint Martin (IT)

( * ) Notice: Subject to any disclaimer, the term of this patent is extended or adjusted under 35 U.S.C. 154(b) by 0 days.

(21) Appl. No.: 10/150,526

(22) Filed: May 17, 2002

(65) Prior Publication Data

US 2003/0005830 A1 Jan. 9, 2003

(30) Foreign Application Priority Data

May 17, 2001 (EP) .............................................. 01830317

(51) Int. Cl.[7] ........................... A47J 39/00; H05B 3/68; A47B 3/02; A47G 23/06
(52) U.S. Cl. .............................. 99/468; 99/331; 99/448; 99/473; 99/483; 165/919; 219/386; 219/502; 219/521
(58) Field of Search .......................... 99/326–331, 339, 99/340, 448, 357, 467, 468, 473–476, 483; 219/386, 387, 400, 402, 502, 385, 521, 523, 409–411; 165/918, 206, 919, 11.1, 12, 48.1; 62/3.2, 3.3, 3.62; 426/237, 243, 302, 466, 523; 312/236; 392/449, 459

(56) References Cited

U.S. PATENT DOCUMENTS

| | | | | | |
|---|---|---|---|---|---|
| 3,275,393 A | * | 9/1966 | Stentz et al. | ............... | 99/468 X |
| 3,886,346 A | * | 5/1975 | Meyers | ...................... | 219/386 |
| 3,908,749 A | * | 9/1975 | Williams | ................ | 165/919 X |
| 3,982,584 A | * | 9/1976 | Spanoudis | ............... | 312/236 X |
| 4,203,486 A | * | 5/1980 | Rubbright et al. | ......... | 165/48.1 |
| 4,285,391 A | * | 8/1981 | Bourner | .................... | 99/468 X |
| 4,346,756 A | * | 8/1982 | Dodd et al. | ............. | 312/236 X |
| 5,028,761 A | * | 7/1991 | Oda et al. | ............... | 165/919 X |
| 5,243,171 A | | 9/1993 | Wood et al. | | |
| 5,454,427 A | * | 10/1995 | Westbrooks et al. | ...... | 99/331 X |
| 5,628,241 A | * | 5/1997 | Chavanaz et al. | ............ | 99/331 |
| 6,034,355 A | * | 3/2000 | Naderi et al. | ............. | 99/480 X |
| 6,073,547 A | * | 6/2000 | Westbrooks, Jr. et al. | .... | 99/468 |
| 6,344,630 B1 | * | 2/2002 | Jarvis et al. | ............. | 99/483 X |

FOREIGN PATENT DOCUMENTS

EP  01830317.2  11/2001

* cited by examiner

Primary Examiner—Timothy F. Simone
(74) Attorney, Agent, or Firm—Graybeal Jackson Haley LLP (57) ABSTRACT

A device for delivering meals at an appropriate temperature comprising: a transport cart equipped with at least one electric energy source, a plurality of plates fastened to said transport cart, each plate comprising at least one thermal energy transfer device operatively connected to the electric energy source, and a plurality of trays, each tray being removably associated to a plate of said plurality of plates and having at least one seat for housing a container or dish containing a meal to be delivered, the device being characterised in that each plate of said plurality of plates comprises means for automatic measuring of the container or dish temperature, which are operatively connected to the processing means for automatic activation of said at least one thermal energy transfer device respectively for heating or cooling when the temperature measured in the container or dish is respectively higher than a maximum value or lower than a minimum value out of a predetermined temperature range.

52 Claims, 7 Drawing Sheets

APPARATUS FOR DELIVERING MEALS AT AN APPROPRIATE TEMPERATURE, PARTICULARLY FOR USE IN HOSPITALS

DESCRIPTION

1. Field of Application

The present invention generally relates to the field of meal preparation and delivery.

More particularly, the present invention relates to a device for delivering meals at an appropriate temperature, particularly for use in hospitals.

2. Prior Art

In hospital environment, it is known that the preparation of meals to be delivered to patients is essentially carried out through two main operating methods.

One of these operating methods provides for the cooking and/or assembly of fresh foods in appropriate kitchens, in order to prepare the desired meals, and for the delivery of said meals to patients by means of appropriate trays.

On the contrary, the other method provides for the cooking of fresh foods, the cooling of cooked foods at a temperature of about 4° C. or lower and food preservation in appropriate refrigerating rooms.

Before being delivered to patients, foods are suitably portioned to form the desired meals and revived by heating at a temperature of about 60–65° C.

It is also known that law requirements in force in this field provide that, once the foods prepared or revived to form the meals, they must not undergo considerable changes in temperature till the actual delivery to patients.

More particularly, in the case of cooked food prepared according to the above-mentioned methods, it is necessary to ensure that the food temperature is kept within the narrow range of 60–70° C. from the preparation or reviving till the delivery to patients.

On the contrary, in the case of food to be served cool, whether cooked or not, the same law requirements provide for the food temperature to be kept around 4° C.

In order to satisfy law requirements, several devices for delivering means have been developed, in which appropriate means are provided for keeping foods at the desired temperature till the actual delivery to patients.

Some of these devices comprise, as means for maintaining food temperature, convection furnaces equipped with fans and conditioners and/or coolers based on hermetic compressors.

Said devices are very expensive and complex both for their structure and operation, they are difficult to transport and require a difficult and expensive maintenance.

Another kind of device commonly used in hospitals for delivering meals at an appropriate temperature comprises a transport cart equipped with shelves for receiving trays which support containers or dishes containing the meals to be delivered to patients.

The trays include a plurality of thermal energy transfer devices effective to keep the food at the appropriate delivery temperature and, in case of reviving, also to raise the food at said temperature.

The transport cart is equipped, in turn, with an electric energy source operatively connected to each of said transfer devices and comprises a control panel equipped with switches effective to activate or deactivate individually said devices, as required.

Although this last device substantially satisfies the aim, it has such serious drawback that it is not possible to carry out a proper control and keeping of food temperature till the actual delivery to patients.

Moreover, said device unfavourably requires the operator manual intervention for activating the thermal energy transfer devices, risking therefore to make mistakes and, particularly, to overheat food.

Finally, trays are of quite complex and complicated construction and the weight thereof is relatively high because of the presence of thermal energy transfer devices.

The technical problem underlying the present invention is to provide a device for delivering meals at an appropriate temperature with such structural and functional features to overcome the above-mentioned drawbacks related to prior art devices.

SUMMARY OF THE INVENTION

Such a technical problem is solved by a device for delivering meals at an appropriate temperature comprising:

- a transport cart equipped with at least one electric energy source,
- a plurality of plates supported or fastened to said transport cart, each plate comprising at least one thermal energy transfer device, which is operatively connected to the electric energy source,
- a plurality of trays, each tray being removably associated to a plate of said plurality of plates and having at least one seat for receiving a container or dish containing the meal to be delivered,
- a unit for automatic measuring of the container or dish temperature located on each plate of said plurality of plates,
- processing means operatively connected to the unit for automatic measuring of the container or dish temperature, which processing means automatically activates said at least one thermal energy transfer device respectively for heating or cooling when the temperature measured in the container or dish is respectively higher than a maximum value or lower than a minimum value out of a predetermined temperature range.

According to a preferred embodiment of the invention, each plate of said plurality of plates also comprises a unit for detecting the presence of a container or dish containing a meal to be revived in said at least one seat.

Further characteristics and advantages of the device for delivering meals according to the invention will be apparent from the following description of a preferred embodiment, given by way of non-limiting example with reference to the accompanying drawings.

DETAILED DESCRIPTION

Referring to the accompanying drawings, a device for delivering meals at an appropriate temperature, particularly for use in hospitals, is generally indicated with 1.

Figure 1:
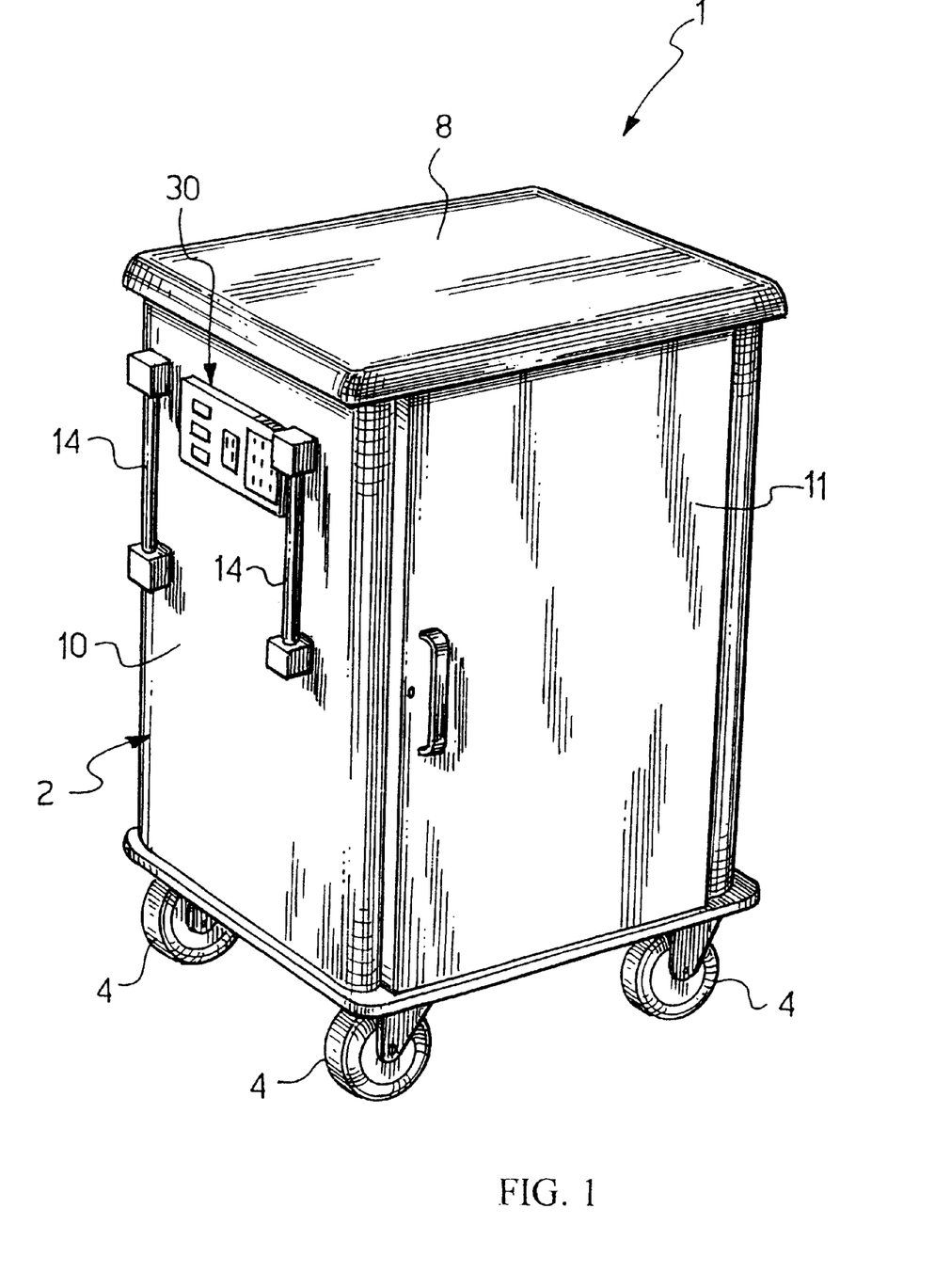
FIG. 1 is a perspective view of a device for delivering meals according to the invention.

The device 1 comprises a transport cart 2 composed of a box-type body equipped on the bottom with rotationally supported wheels 4 enabling the cart 2 to move freely in any direction.

Figure 2:
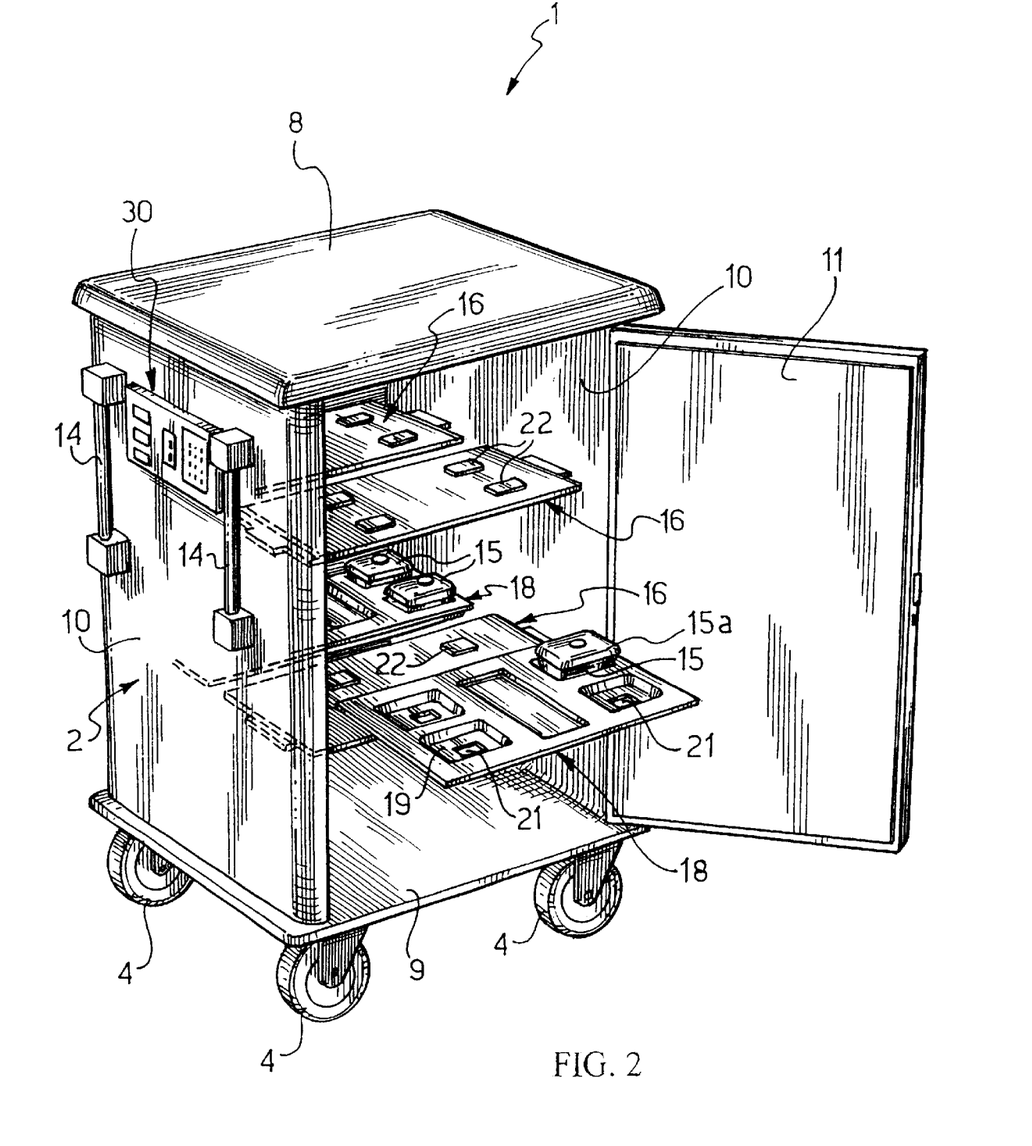
FIG. 2 is a perspective view of the device of FIG. 1 in an open configuration.

The box-type body 2 is open on one side and is adapted to contain a predetermined maximum number of plates 16 and corresponding trays 18, which will be described hereafter. More particularly, the box-type body 2 is delimited on the top by a panel 8, on the bottom by a base panel 9 and sideways by two opposed panels 10.

An access door 11 is mounted into the box-type body 2 in correspondence with the open side.

Internally, the box-type body 2 also comprises a plurality of plates 16 arranged in overlapped rows and conventionally supported or fastened to each side panel 10.

Each plate 16 is associated to a tray 18 containing meals to be delivered.

Near to the upper end of a panel 10, the transport cart 2 also comprises two opposed handles 14, which are vertically located to enable an easier transport of the cart 2 by the operator.

The cart size can be obviously modified at will by the skilled person according to specific loading capacity requirements of plates and corresponding trays. At this purpose, the skilled person can also provide to split the box-type body of the transport cart 2 in two or more compartments for receiving said plates and trays.

The transport cart 2 comprises also an electric energy source (not shown since conventional), for example such a storage device as a rechargeable battery, which is operatively connected to each plate 16 by means of an electric circuit.

Moreover, the cart 2 is also equipped with appropriate conventional means (not shown) connected to an external electric network, i.e. by means of an outlet, for recharging the electric energy source or for direct supply of electric energy to each plate 16, as required.

Figure 3:
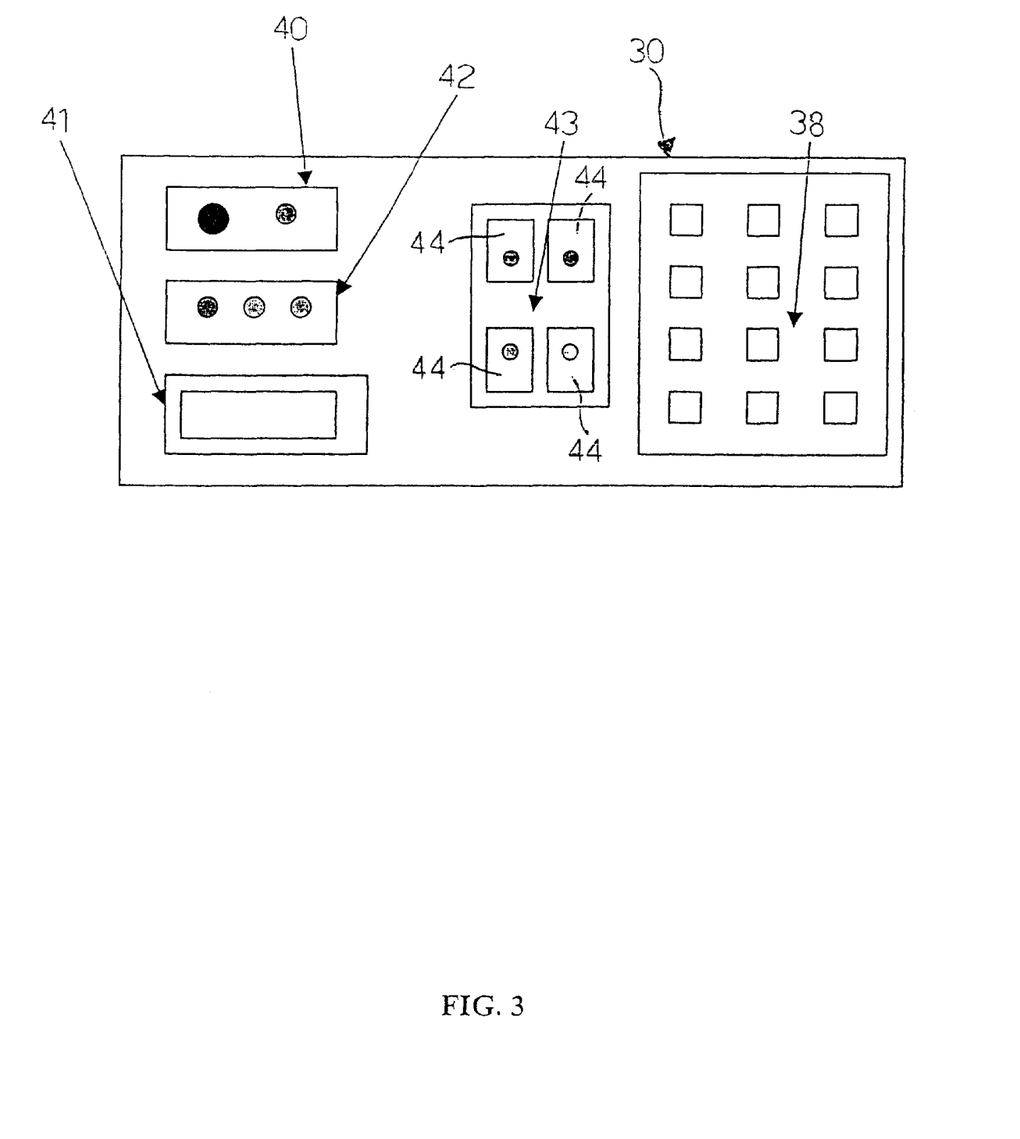
FIG. 3 is a schematic view of a detail of the device of FIG. 1.

Referring to FIG. 3, a control panel 30 incorporating a plurality of light and/or audio indicators is provided in the front of the transport cart 2. Said indicators enable the user to monitor the correct operation of the whole device and to receive information about the heating/cooling process.

Figure 4:
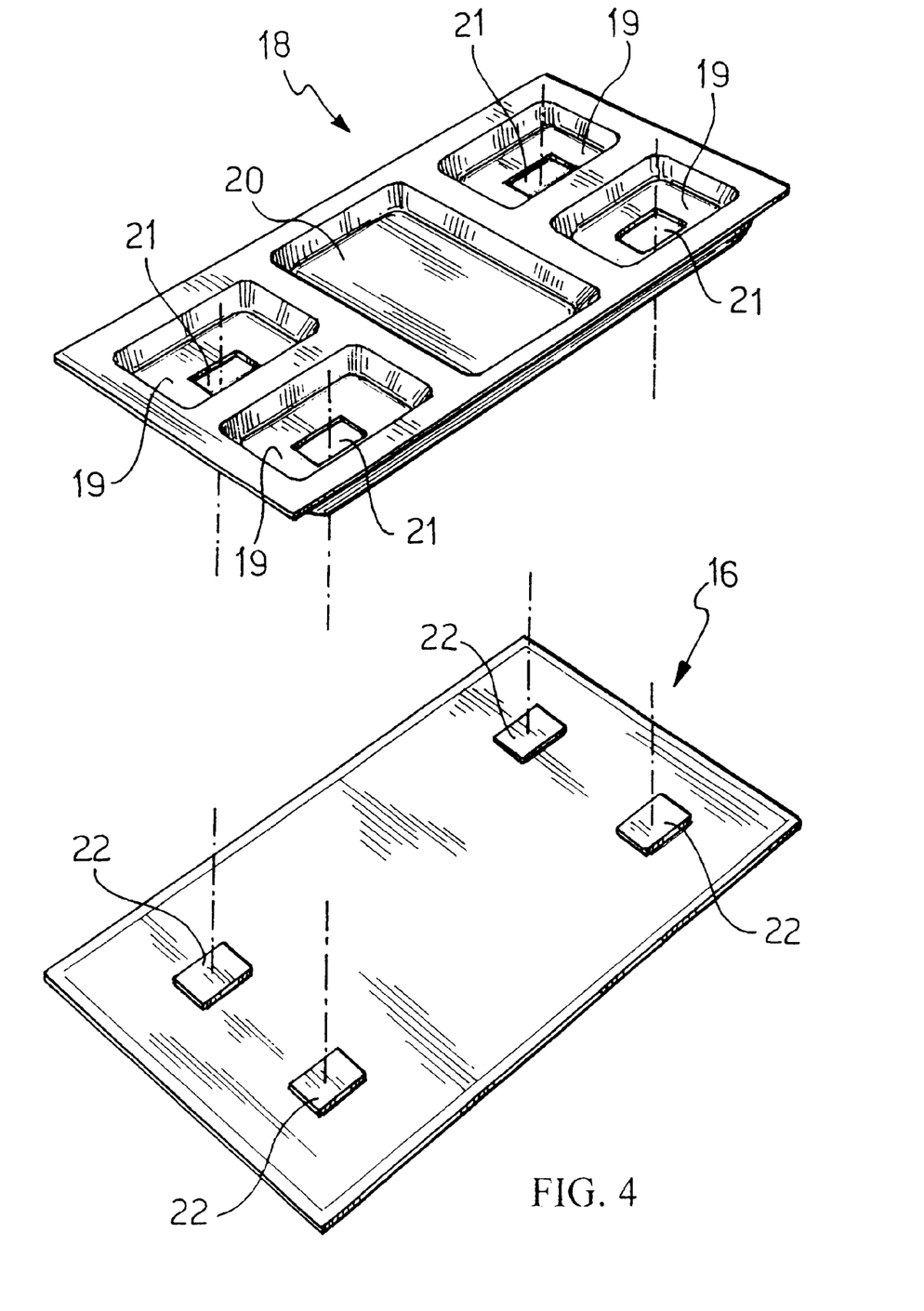
FIG. 4 is a perspective view of a tray and a plate composing the device of FIG. 1.
Figure 5:
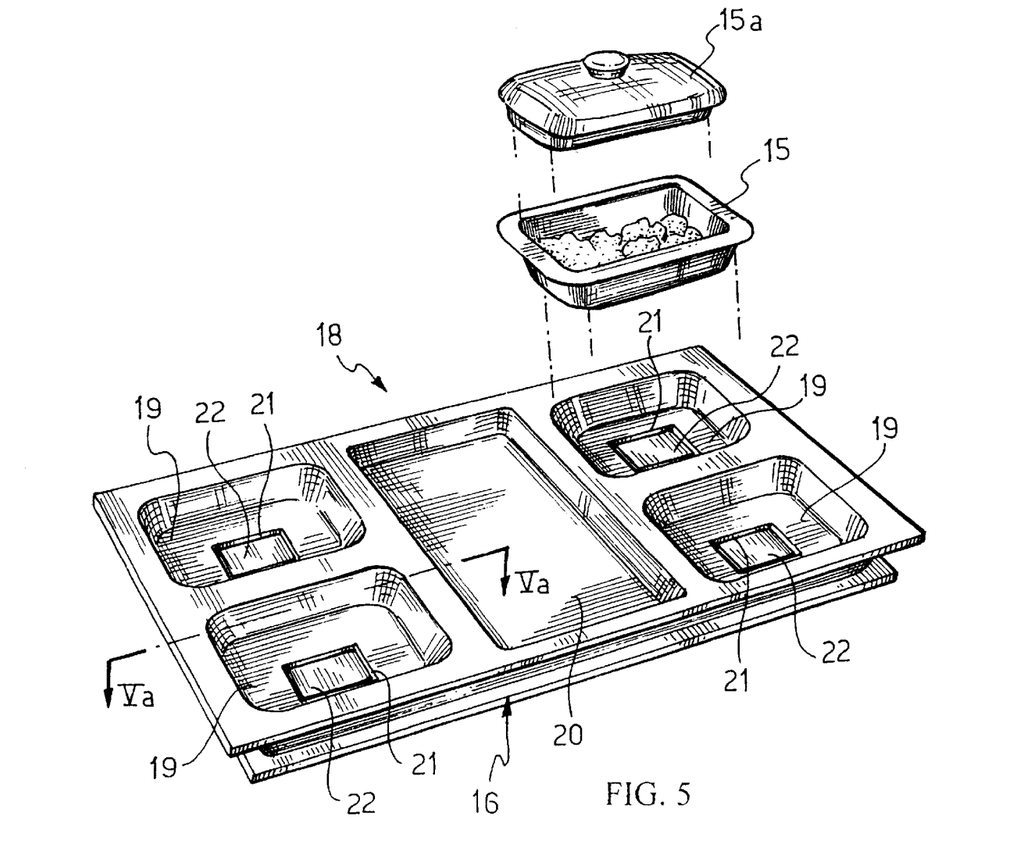
FIG. 5 is a perspective view of the tray and the plate of FIG. 4, which are reciprocally associated, and also of a food container used in said tray.

FIGS. 4 and 5 show a plate 16 and a corresponding tray 18, respectively spaced and associated, for use with the transport cart 2 of FIG. 1.

The plate 16 and tray 18 have both rectangular shape, commonly used standard size and they are made of materials suitable to contact foods, preferably plastic.

More particularly, four substantially identical peripheral seats 19 and a central opening 20 are provided in the tray 18.

Each seat 19 is adapted to receive a container or dish 15, made of ceramic or other material, containing a meal to be delivered and it is thermally insulated from the other seats 19.

Each container 15 is preferably equipped with a lid 15a for protecting the food from external pollutants and avoiding losses of heat. The containers are conventionally-styled, their form and aspect fitting to common board requirements and being preferably made of plastic material.

The central opening 20 can instead advantageously receive board equipment.

Figure 5A:
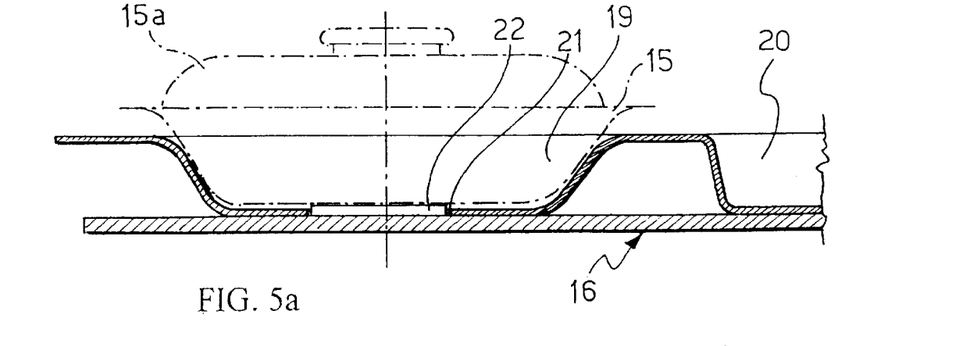
FIG. 5a is a sectional view of the reciprocally associated tray and plate taken along the Va—Va line of FIG. 5.

The plate 16 is equipped on the top with four thermal energy transfer devices 22, each device being located in a seat 19 passing through a corresponding hole 21, once the tray 18 is associated to the plate 16.

Said conventional transfer devices 22, when electrically activated, can trigger an heating or cooling thermal process allowing the food stored in the containers 15 located in the seats 19 to be kept at an appropriate temperature.

In the device according to the invention, thermoelectric heat pumps, known as Peltier effect pumps, are preferably used as thermal energy transfer devices.

Said heat pumps allow a considerable efficiency in thermal energy transfer with low operation and maintenance costs.

In practise, in the device according to the invention, the plate 16 is fastened to the cart 2 while the tray 18 carrying the containers 15 is delivered to consumers.

According to the present invention, each plate 16 comprises a unit for automatic measuring of the container or dish 15 temperature in each seat 19, which is operatively connected to the processing means.

Said processing means can automatically and selectively activate the thermal energy transfer devices 22 respectively for heating or cooling when the container or dish 15 temperature is respectively higher than a maximum value or lower than a minimum value out of a predetermined temperature range.

Said predetermined temperature range is preferably between 20° C. and 30° C.

More particularly, the processing means activate the thermal energy transfer devices 22 for heating in order to keep the container or dish 15 at a minimum temperature of 60° C., preferably between 60 and 70° C., or for cooling in order to keep the container or dish 15 at a maximum temperature of 4° C., preferably between 0 and 4° C.

According to a preferred embodiment of the invention, each plate 16 also comprises in each seat 19 a unit for detecting the presence of a container or dish 15 containing a meal to be revived.

Said detection unit is operatively connected to the processing means 27 for automatic and selective activation of the thermal energy transfer devices 22 for heating, in order to revive said meal and keep the container or dish 15 at a minimum temperature of 60° C.

Preferably, the unit for detecting the presence of the container or dish 15 containing a meal to be revived comprise at least one magnetic sensor 45 located on each plate 16, in correspondence with each seat 19, said at least one sensor being able to detect the presence of at least one corresponding magnetic sensor located on said container or dish 15.

It is obviously possible to use also sensors of different kind for detecting a presence, e.g. optical sensors, but the efficiency of these last sensors can be reduced or even compromised by the presence of impurities in the containers 15 and/or trays 18.

Preferably, the temperature measuring unit comprises at least one probe or thermal sensor 26 in correspondence with each seat 19, while the processing means comprise at least one microcontroller control unit 27.

Figure 6:
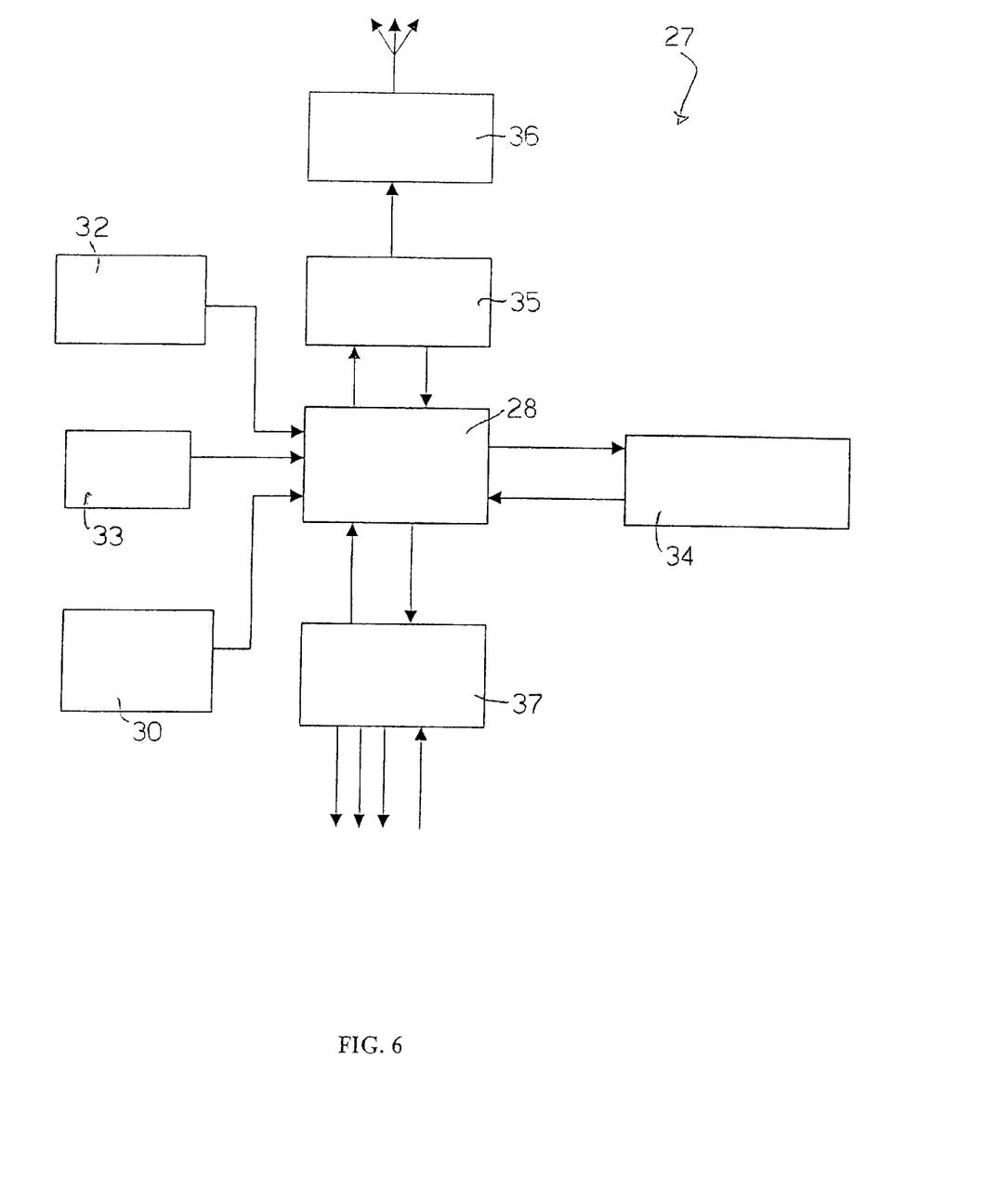
FIG. 6 is a schematic block view of an electronic control unit incorporated in the device of FIG. 1.

The control unit 27 comprises an electronic card, not shown since conventional, which houses and feeds some interlinked electronic components. The unit 27 comprises a microcontroller or microprocessor 28, also known as CPU (Central Processing Unit), which is electrically fed by means of a feeder 32.

The microcontroller 28 operation is ruled by a timer 33 located in the electronic card.

The microcontroller 28 is bi-directionally connected to a memory 34, i.e. a read and write non-volatile memory, which stores the data and programs used for the operation of the device 1 according to the invention.

The microcontroller 28 is associated also to an external serial interface 35, effective to receive and transfer data from and to a modem 36, and to an internal serial interface effective to receive and transfer data from and to the plates 16.

The microcontroller 28 is obviously connected also to the control panel 30 which enables the desired tray 18 to be recalled by means of a keyboard 38 in order to check the configuration thereof. In practise, the connection to the control panel 30 allows the microcontroller 28 to control the various indicators and, more particularly, a light indicator 40 and corresponding on/off control, a light indicator 41 showing the battery charge level and a light indicator 42 of active electric supply source, i.e. electric network, battery or other.

Advantageously, a schematic ideogram 43 reproducing the features of the tray 18 is provided, which has a light indicator 44 in correspondence with each seat 19. The ideogram 43 can be seen on the control panel 30 and allows the visual check of the thermal status of each seat 19 and corresponding container or dish 15 housed therein. At this purpose, the colour of each light indicator 44 may correspond to the thermal status of the corresponding seat 19, i.e. red during heating, green during keeping in temperature and blue during cooling.

Figure 7:
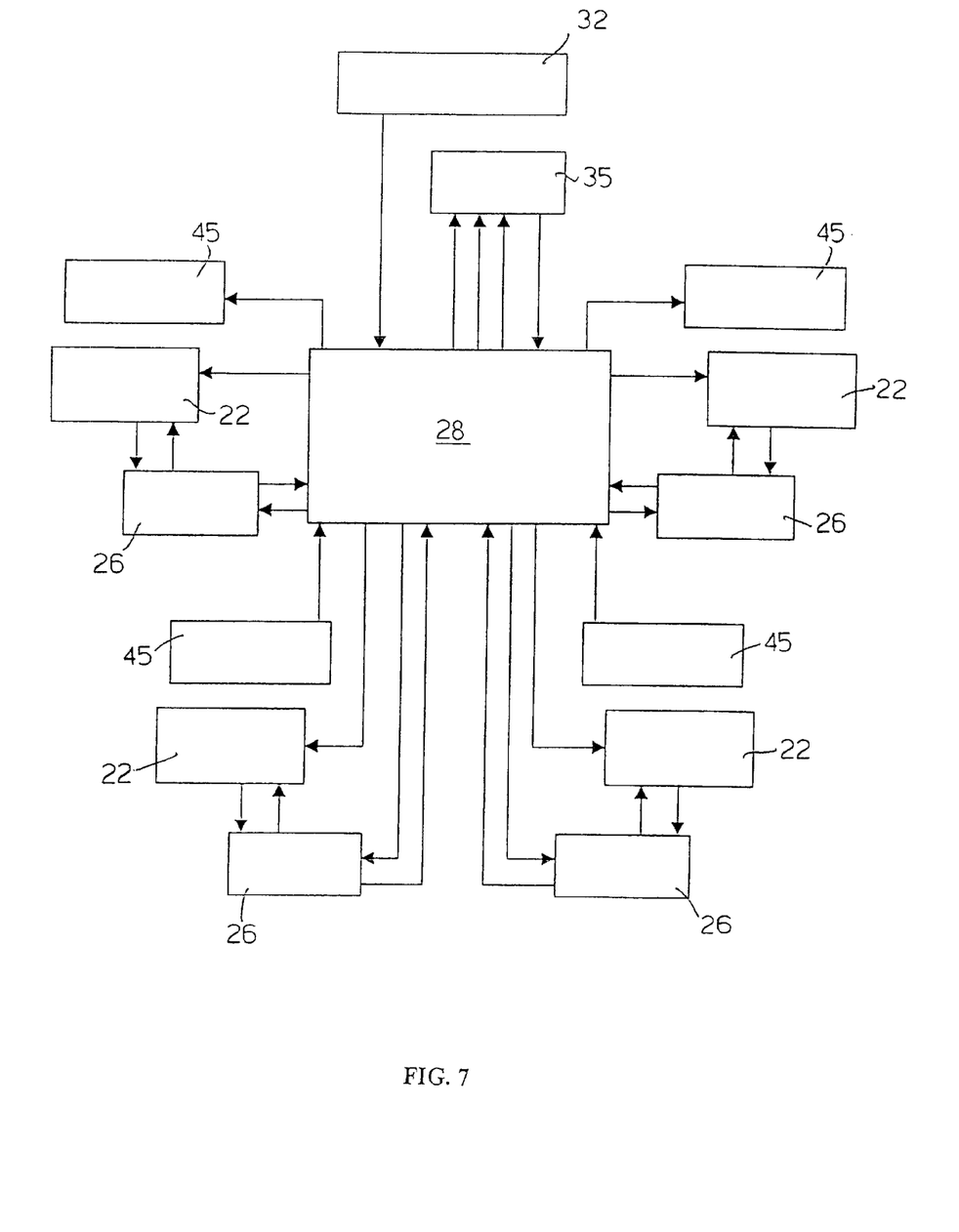
FIG. 7 is a schematic block view of the control unit of FIG. 6 and of the interconnections thereof to operative portions of the device according to the invention.

With particular reference to the scheme of FIG. 7, it is possible to notice that the microcontroller 28 is connected to each presence detection sensor 45 housed in the plate 16 in correspondence with the seats 19 of trays 18.

Moreover, the microcontroller 28 is connected also to each thermal energy transfer device 22 and to the thermal sensors 26.

The control unit 27 is operatively connected to each transfer device 22 and, consequently, to the energy source provided in the transport cart 2, by means of an appropriate electric connection circuit provided in the transport cart 2.

To put the device 1 of the invention into operation, the trays 18 are located in the transport cart 2 on the corresponding plates 16, the containers or dishes 15 containing the food to be delivered are located in the corresponding seats 19 and the starting control 40 is activated for the electric supply to the transport cart 2.

When turning the transport cart 2 on, the probes or thermal sensors 26 enables the container or dish 15 temperature in the corresponding seats 19 to be automatically measured, transmitting appropriate signals to the control unit 27.

In the meantime, the sensors 45 detect the presence in the seats 19 of the containers or dishes 15 containing the food to be revived, said containers or dishes being previously equipped with a recognition sensor, transmitting appropriate signals to the control unit 27.

Said signals are processed by the control unit 27 which activates the corresponding heating or cooling thermal process in the thermal energy transfer devices 22, ensuring that the temperature in containers or dishes 15 is kept at a minimum of 60° C. or a maximum of 4° C. respectively.

It is to be noted that, in the case of containers or dishes 15 containing food to be revived (which are equipped with an appropriate recognition sensor), the control unit 27 activates the thermal heating process independently of the temperature of said containers or dishes 15 measured by the corresponding sensors 26.

Therefore, refrigerated or deep-freezed food reviving operations are totally automatic and can advantageously be carried out directly on the device of the invention.

The main advantage of the system for delivering meals according to the invention consists in the ability of recognising automatically the kind of containers or dishes containing the foods to be heated or cooled and of keeping automatically said foods at the appropriate delivery temperature.

Advantageously, no attention is therefore to be drawn to container positioning on the tray body, thus avoiding any wrong operation by an eventually inattentive operator.

A further advantage of the system according to the invention consists in the possibility of carrying out automatically also reviving operations on refrigerated or deep-freezed foods.

Another advantage of the delivering system according to the invention is that it can use only one kind of containers and corresponding lids, thus making the washing, tidying and storing of said materials much easier.

A further advantage of the delivering system is that it uses thermal energy transfer devices, such as Peltier effect heat pumps, which ensure a considerable thermal efficiency during heating and cooling operations, as well as low operation and maintenance costs.

To comply with specific and actual requirements, the skilled person can obviously make several modifications and changes to the above-described device, without departing from the scope of the invention, as defined in the following claims.

What is claimed is:

1. Device for delivering meals at an appropriate temperature, particularly for use in hospitals, comprising:
   a transport cart equipped with at least one electric energy source,
   a plurality of plates supported or fastened to said transport cart, each plate comprising at least one thermal energy transfer device, which is operatively connected to the electric energy source,
   a plurality of trays, each tray being removably associated to a plate of said plurality of plates and having at least one seat for receiving a container or dish containing the meal to be delivered,
   a unit for automatic measuring of the container or dish temperature located on each plate of said plurality of plates,
   processing means operatively connected to the unit for automatic measuring of the container or dish temperature, which processing means automatically activates said at least one thermal energy transfer device respectively for heating or cooling when the temperature measured in the container or dish is respectively higher than a maximum value or lower than a minimum value out of a predetermined temperature range.

2. Device according to claim 1, wherein said predetermined temperature range is between 20° C. and 30° C.

3. Device according to claim 2, wherein the processing means activates said at least one thermal energy transfer device for heating in order to keep the container or dish at a minimum temperature of 60° C.

4. Device according to claim 3, wherein the processing means activates said at least one thermal energy transfer device for heating in order to keep the container or dish temperature within the range of 60–70° C.

5. Device according to claim 2, wherein the processing means activates said at least one thermal energy transfer device for cooling in order to keep the container or dish at a maximum temperature of 4° C.

6. Device according to claim 5, wherein the processing means activates said at least one thermal energy transfer device for cooling in order to keep the container or dish temperature within the range of 0–4° C.

7. Device according to claim 1, wherein each plate of the plurality of plates also comprises a unit for detecting the presence of a container or dish containing a meal to be revived in said at least one seat.

8. Device according to claim 7, wherein the unit for detecting the container or dish presence in said at least one seat is operatively connected to the processing means for automatic activation of said at least one thermal energy transfer device for heating in order to revive said meal and keep the container or dish at a minimum temperature of 60° C.

9. Device according to claim 8, wherein the unit for detecting the presence of the container or dish containing a meal to be revived in said at least one seat comprises at least one magnetic sensor located on each plate of said plurality of plates, said at least one sensor being able to detect the presence of at least one corresponding magnetic sensor located on said container or dish.

10. Device according to claim 1, wherein the temperature measuring unit comprises at least one probe or thermal sensor in correspondence with each seat.

11. Device according to claim 1, wherein the processing means comprises at least one microcontroller control unit.

12. Device according to claim 1, wherein said at least one thermal energy transfer device is a Peltier effect heat pump.

13. Device for delivering meals at an appropriate temperature, particularly for use in hospitals, comprising:
- a transport cart equipped with at least one electric energy source,
- a plurality of plates supported or fastened to said transport cart, each plate comprising at least one Peltier effect heat pump, which is operatively connected to the electric energy source,
- a plurality of trays, each tray being removably associated to a plate of said plurality of plates and having at least one seat for receiving a container or dish containing the meal to be delivered,
- a unit for automatic measuring of the container or dish temperature located on each plate of said plurality of plates,
- processing means operatively connected to the unit for automatic measuring of the container or dish temperature, which processing means automatically activates said at least one Peltier effect heat pump respectively for heating or cooling when the temperature measured in the container or dish is respectively higher than a maximum value or lower than a minimum value out of a predetermined temperature range.

14. Device according to claim 13, wherein said predetermined temperature range is between 20° C. and 30° C.

15. Device according to claim 14, wherein the processing means activates said at least one Peltier effect heat pump for heating in order to keep the container or dish at a minimum temperature of 60° C.

16. Device according to claim 15, wherein the processing means activates said at least one Peltier effect heat pump for heating in order to keep the container or dish temperature within the range of 60–70° C.

17. Device according to claim 14, wherein the processing means activates said at least one Peltier effect heat pump for cooling in order to keep the container or dish at a maximum temperature of 4° C.

18. Device according to claim 17, wherein the processing means activates said at least one Peltier effect heat pump for cooling in order to keep the container or dish temperature within the range of 0–4° C.

19. Device according to claim 13, wherein each plate of the plurality of plates also comprises a unit for detecting the presence of a container or dish containing a meal to be revived in said at least one seat.

20. Device according to claim 13, wherein the unit for detecting the container or dish presence in said at least one seat is operatively connected to the processing means for automatic activation of said at least one Peltier effect heat pump for heating in order to revive said meal and keep the container or dish at a minimum temperature of 60° C.

21. Device according to claim 20, wherein the unit for detecting the presence of the container or dish containing a meal to be revived in said at least one seat comprises at least one magnetic sensor located on each plate of said plurality of plates, said at least one sensor being able to detect the presence of at least one corresponding magnetic sensor located on said container or dish.

22. Device according to claim 13, wherein the temperature measuring unit comprises at least one probe or thermal sensor in correspondence with each seat.

23. Device according to claim 13, wherein the processing means comprises at least one microcontroller control unit.

24. Device for delivering meals at an appropriate temperature, particularly for use in hospitals, comprising:
- a transport cart equipped with at least one electric energy source,
- a plurality of plates supported or fastened to said transport cart, each plate comprising at least one thermal energy transfer device, which is operatively connected to the electric energy source,
- a plurality of trays, each tray being removably associated to a plate of said plurality of plates and having at least one seat for receiving a container or dish containing the meal to be delivered,
- at least one probe or thermal sensor for automatic measuring of the container or dish temperature located on each plate of said plurality of plates in correspondence with each seat,
- processing means operatively connected to the at least one probe or thermal sensor for automatic measuring of the container or dish temperature, which processing means automatically activates said at least one thermal energy transfer device respectively for heating or cooling when the temperature measured in the container or dish is respectively higher than a maximum value or lower than a minimum value out of a predetermined temperature range.

25. Device according to claim 24, wherein said predetermined temperature range is between 20° C. and 30° C.

26. Device according to claim 25, wherein the processing means activates said at least one thermal energy transfer device for heating in order to keep the container or dish at a minimum temperature of 60° C.

27. Device according to claim 26, wherein the processing means activates said at least one thermal energy transfer device for heating in order to keep the container or dish temperature within the range of 60–70° C.

28. Device according to claim 25, wherein the processing means activates said at least one thermal energy transfer device for cooling in order to keep the container or dish at a maximum temperature of 4° C.

29. Device according to claim 28, wherein the processing means activates said at least one thermal energy transfer device for cooling in order to keep the container or dish temperature within the range of 0–4° C.

30. Device according to claim 24, wherein each plate of the plurality of plates also comprises a unit for detecting the presence of a container or dish containing a meal to be revived in said at least one seat.

31. Device according to claim 30, wherein the unit for detecting the container or dish presence in said at least one seat is operatively connected to the processing means for automatic activation of said at least one thermal energy transfer device for heating in order to revive said meal and keep the container or dish at a minimum temperature of 60° C.

32. Device according to claim 31, wherein the unit for detecting the presence of the container or dish containing a meal to be revived in said at least one seat comprises at least one magnetic sensor located on each plate of said plurality of plates, said at least one sensor being able to detect the presence of at least one corresponding magnetic sensor located on said container or dish.

33. Device according to claim 24, wherein the processing means comprises at least one microcontroller control unit.

34. Device according to claim 24, wherein said at least one thermal energy transfer device is a Peltier effect heat pump.

35. Device for delivering meals at an appropriate temperature, particularly for use in hospitals, comprising:
- a transport cart equipped with at least one electric energy source,
- a plurality of plates supported or fastened to said transport cart, each plate comprising at least one thermal energy transfer device, which is operatively connected to the electric energy source,
- a plurality of trays, each tray being removably associated to a plate of said plurality of plates and having at least one seat for receiving a container or dish containing the meal to be delivered,
- a unit for automatic measuring of the container or dish temperature located on each plate of said plurality of plates,
- a microcontroller control unit operatively connected to the unit for automatic measuring of the container or dish temperature, which at least one microcontroller control unit automatically activates said at least one thermal energy transfer device respectively for heating or cooling when the temperature measured in the container or dish is respectively higher than a maximum value or lower than a minimum value out of a predetermined temperature range.

36. Device according to claim 35, wherein said predetermined temperature range is between 20° C. and 30° C.

37. Device according to claim 36, wherein the microcontroller control unit activates said at least one thermal energy transfer device for heating in order to keep the container or dish at a minimum temperature of 60° C.

38. Device according to claim 37, wherein the microcontroller control unit activates said at least one thermal energy transfer device for heating in order to keep the container or dish temperature within the range of 60–70° C.

39. Device according to claim 36, wherein the microcontroller control unit activates said at least one thermal energy transfer device for cooling in order to keep the container or dish at a maximum temperature of 4° C.

40. Device according to claim 39, wherein the microcontroller control unit activates said at least one thermal energy transfer device for cooling in order to keep the container or dish temperature within the range of 0–4° C.

41. Device according to claim 35, wherein each plate of the plurality of plates also comprises a unit for detecting the presence of a container or dish containing a meal to be revived in said at least one seat.

42. Device according to claim 41, wherein the unit for detecting the container or dish presence in said at least one seat is operatively connected to the microcontroller control unit for automatic activation of said at least one thermal energy transfer device for heating in order to revive said meal and keep the container or dish at a minimum temperature of 60° C.

43. Device according to claim 42, wherein the unit for detecting the presence of the container or dish containing a meal to be revived in said at least one seat comprises at least one magnetic sensor located on each plate of said plurality of plates, said at least one sensor being able to detect the presence of at least one corresponding magnetic sensor located on said container or dish.

44. Device according to claim 35, wherein the temperature measuring unit comprises at least one probe or thermal sensor in correspondence with each seat.

45. Device according to claim 35, wherein said at least one thermal energy transfer device is a Peltier effect heat pump.

46. Device for delivering meals at an appropriate temperature, particularly for use in hospitals, comprising:
- a transport cart equipped with at least one electric energy source,
- a plurality of plates supported or fastened to said transport cart, each plate comprising at least one Peltier effect heat pump, which is operatively connected to the electric energy source,
- a plurality of trays, each tray being removably associated to a plate of said plurality of plates and having at least one seat for receiving a container or dish containing the meal to be delivered,
- at least one probe or thermal sensor for automatic measuring of the container or dish temperature located on each plate of said plurality of plates in correspondence with each seat,
- a microcontroller control unit operatively connected to the at least probe or thermal sensor for automatic measuring of the container or dish temperature, which microcontroller control unit automatically activates said at least one Peltier effect heat pump respectively for heating or cooling when the temperature measured in the container or dish is respectively higher than a maximum value or lower than a minimum value out of a predetermined temperature range.

47. Device according to claim 46, wherein said predetermined temperature range is between 20° C. and 30° C.

48. Device according to claim 47, wherein the microcontroller control unit activates said at least one Peltier effect heat pump for heating in order to keep the container or dish at a minimum temperature of 60° C.

49. Device according to claim 48, wherein the microcontroller control unit activates said at least one Peltier effect heat pump for heating in order to keep the container or dish temperature within the range of 60–70° C.

50. Device according to claim 47, wherein the microcontroller control unit activates said at least one Peltier effect heat pump for cooling in order to keep the container or dish at a maximum temperature of 4° C.

51. Device according to claim 50, wherein the microcontroller control unit activates said at least one Peltier effect heat pump for cooling in order to keep the container or dish temperature within the range of 0–4° C.

52. Device according to claim 46, wherein each plate of the plurality of plates also comprises a magnetic sensor for detecting the presence of a container or dish containing a meal to be revived in said at least one seat, said container or dish containing a meal to be revived being equipped with a corresponding magnetic sensor and said magnetic sensor for detecting the presence of a container or dish containing a meal to be revived being operatively connected to the microcontroller control unit for automatic activation of said at least one Peltier effect heat pump for heating in order to revive said meal and keep the container or dish at a minimum temperature of 60° C.

* * * * *